E. FLENTJE.
SHOCK ABSORBER.
APPLICATION FILED JAN. 16, 1918.
1,267,532.
Patented May 28, 1918.
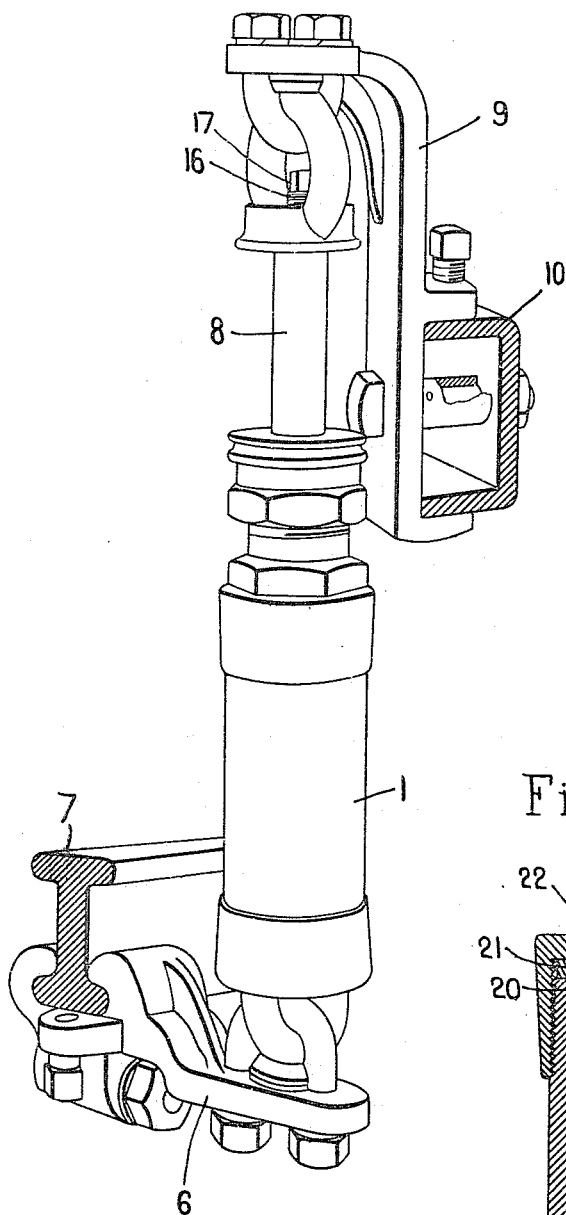
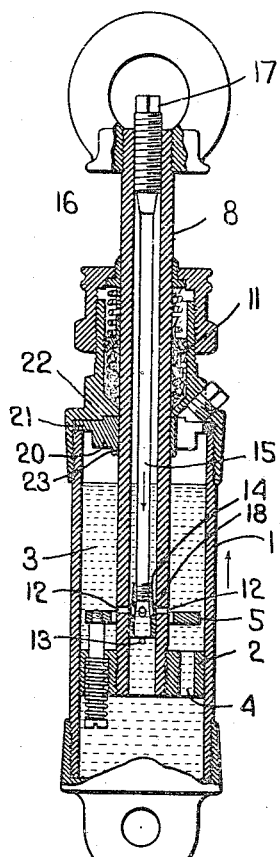
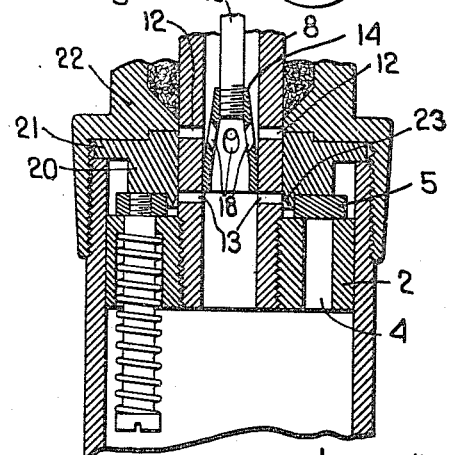
Inventor.
Ernst Flentje
by Heard Smith & Tennant.
Attys.

UNITED STATES PATENT OFFICE.

ERNST FLENTJE, OF CAMBRIDGE, MASSACHUSETTS.

SHOCK-ABSORBER.

1,267,532.

Specification of Letters Patent.  Patented May 28, 1918.

Application filed January 16, 1918.  Serial No. 211,999.

*To all whom it may concern:*

Be it known that I, ERNST FLENTJE, a citizen of the United States, residing at Cambridge, county of Middlesex, State of Massachusetts, have invented an Improvement in Shock-Absorbers, of which the following description, in connection with the accompanying drawing, is a specification, like characters on the drawing representing like parts.

This invention relates to shock absorbers for automobiles of that type having a liquid-containing cylinder connected to the chassis and a piston within the cylinder operatively connected to the body. As illustrating shock absorbers having this construction reference may be made to my former Patents No. 1,227,126, May 22, 1917, No. 1,013,384, January 2, 1912, and No. 1,045,136, November 26, 1912.

The object of my present invention is to provide an improved shock absorber of this type which will more effectively prevent recoil of the spring and which is constructed so that the movement of the piston against the upper end of the cylinder will be cushioned, thus obviating the possibility of the piston striking the cylinder end.

In order to give an understanding of my invention, I have illustrated in the drawings a selected embodiment thereof which will now be described, after which the novel features thereof will be pointed out in the appended claims.

In the drawings, Figure 1 is a perspective view of a shock absorber embodying my invention;

Fig. 2 is a sectional view thereof;

Fig. 3 is an enlarged fragmentary sectional view showing the piston at the upper end of the cylinder.

1 indicates the cylinder of the shock absorber and 2 the piston which operates therein. The cylinder is adapted to contain a liquid resistant 3 such as oil or glycerin, and the piston is provided with ports 4 which are controlled by a check-valve 5 on the upper side of the piston, said check-valve operating to permit the piston to freely descend, but closing automatically as the piston rises.

The cylinder 1 is connected to a bracket or hanger 6 which in turn is secured to some portion 7 of the chassis of the automobile. The piston has a piston-rod 8 extending through the top of the cylinder, said piston-rod in turn being connected to a bracket or hanger 9 which is secured to some part 10 of the automobile body. 11 indicates a stuffing box of usual construction which prevents leakage around the piston-rod.

The parts thus far described are or may be all as illustrated in my above-mentioned patents and form no part of my present invention.

In accordance with the present invention the piston-rod 8 is made hollow and is provided with a plurality of relatively small ports 12 which communicate with the space above the piston. Said piston-rod is also provided with two relatively small ports 13 which are situated between the ports 12 and the piston, said ports 13 being situated close to the piston. 14 indicates a piston valve which is situated inside of the piston-rod 8 and by which the ports 13 can be regulated. This piston valve 14 is connected to a stem 15 which extends up through the piston rod and is provided at its upper end with the screw-threaded portion 16 which has screw-threaded engagement with the upper end of the piston rod. The end of the stem 15 is provided with a wrench-receiving head 17 by which the valve may be adjusted. The valve is also provided with ports 18 leading to the space within the piston rod 8 and between the latter and the stem 15 so that the lower end of the cylinder has communication with the interior of the piston rod 8 through the ports 18. These ports 18 also provide a communication between the lower end of the cylinder and the ports 12.

The chamber within the hollow piston rod 8 is in the nature of an air chamber and will be normally filled with air. When the spring of the automobile is compressed, the piston will be forced downwardly in the cylinder 1. The valve 5 will automatically lift thereby to open the ports 4, and allow some of the liquid that is beneath the piston to be transferred to the space above the piston through said ports. Part of the liquid will also be transferred to the space above the piston through the ports 12 and 13. Since the air chamber in the interior of the piston rod communicates with the lower end of the cylinder through the ports 18, the pressure to which the liquid beneath the piston is subjected as the piston descends will force some of the liquid through the ports 18 into the interior of the piston rod, thus compressing the air therein, this operation giving some resiliency and flexibility to the operation of the device.

When the spring recoils after being compressed the piston 2 is moved upwardly and the valve 5 will close the ports 4. The piston can then move upwardly only as fast as the liquid can be transferred through the ports 12 and 13. This upward movement of the piston will tend to produce suction which will act to draw out through the ports 18 any liquid which may have been forced into the interior of the piston rod and will also create more or less of a vacuum in the interior of the piston rod. This operation results in increasing the resiliency or flexibility of the device. The hollow piston-rod, therefore, with the form of valve 14 provides means whereby the upward movement of the piston is cushioned by compression of air in the interior of the piston rod, and the downward movement is cushioned by the forming of a partial vacuum within the piston rod.

In my present invention I have also provided means to prevent the piston from coming into contact with the upper end of the cylinder thereby making an undesirable clicking noise. Situated in the cylinder at its upper end is a collar 20 which closely fits the piston rod, said collar having the flange 21 that is clamped between the end of the cylinder and the cylinder head 22. If during the operation of the device the piston should be forced clear to the upper end of the cylinder, then the ports 12 will be carried into the collar 20 and the collar will thus close said ports. When this occurs, then the liquid can be transferred from the upper to the lower side of the piston only through the ports 13, and as there are only two of these ports and they are relatively small, the further upward movement of the piston will be very materially checked. The last movement of the piston will thus be cushioned so that it cannot strike the collar a sharp blow. The ports 13 are so situated that when the piston is at the extreme upper limit of its movement, said ports are just entering the collar. The collar is provided with a bevel 23 so that the ports 13 will not be entirely closed even when the piston is at the extreme upper limit of its movement. With this arrangement, however, the movement of the piston will be checked as it approaches the upper end of the cylinder so that it cannot be brought with any force against the collar 20.

The improvements which I have incorporated in this device add materially to the flexibility and elasticity thereof.

I claim:

1. In a shock absorber, the combination with a cylinder, of a valved piston therein, a hollow piston rod secured to the piston and extending through one end of the cylinder, said piston rod having ports therein above the piston, a hollow piston valve situated within the piston rod, the outer end of said valve fitting the interior of the piston rod and the inner end being of smaller diameter and provided with lateral ports, a valve stem secured to said smaller end of the piston valve and extending through the hollow piston rod and by which the larger end of said piston valve may be adjusted to control the ports in the piston rod, the space within the hollow piston rod constituting an air chamber which has communication with the space below the piston through the ports in the piston valve.

2. In a shock absorber, the combination with a cylinder adapted to contain liquid, of a valved piston therein, a hollow piston rod connected to the piston, said piston rod having two sets of ports therein situated different distances from the piston, a collar situated within the cylinder at its upper end fitting the piston rod, said ports being so situated that when the piston is at the upper end of the cylinder the ports of one set are situated within and closed by the collar and the ports of the other set are situated within and partially closed by the collar.

In testimony whereof, I have signed my name to this specification.

ERNST FLENTJE.